United States Patent [19]

Paez et al.

[11] Patent Number: 4,534,030
[45] Date of Patent: Aug. 6, 1985

[54] SELF-CLOCKED SIGNATURE ANALYZER

[75] Inventors: Ricardo Paez; Jorge R. Rodriguez, both of Boca Raton, Fla.

[73] Assignee: International Business Machines Corporation, Armonk, N.Y.

[21] Appl. No.: 451,506

[22] Filed: Dec. 20, 1982

[51] Int. Cl.³ .............................................. G06F 3/04
[52] U.S. Cl. ...................................... 371/25; 371/24; 371/20; 364/200
[58] Field of Search ........................... 371/20, 24, 25; 364/200, 900; 377/39, 107, 110; 375/117

[56] References Cited

U.S. PATENT DOCUMENTS

| | | | |
|---|---|---|---|
| 3,426,296 | 10/1965 | Christiensen | 375/117 |
| 3,678,222 | 7/1972 | Boehly | 179/175.31 |
| 3,976,864 | 8/1976 | Gordon | 371/24 |
| 4,053,738 | 10/1977 | Besenfelder et al. | 377/39 |
| 4,090,035 | 5/1978 | Popkin | 179/15 |
| 4,101,732 | 7/1978 | Suzuki | 375/117 |
| 4,192,451 | 3/1980 | Swerling et al. | 371/20 |
| 4,408,272 | 10/1983 | Walters | 364/200 |
| 4,441,074 | 4/1984 | Bockett-Pugh et al. | 371/25 |
| 4,454,600 | 6/1984 | Le Gresley | 371/25 |

FOREIGN PATENT DOCUMENTS 0120310  10/1978  Japan ........................ 375/117

OTHER PUBLICATIONS

IBM Technical Disclosure Bulletin, "Storage Control Unit Sequence and Cycle Scanner", K. D. Crowe et al., vol. 18, No. 10, Mar. 1976, pp. 3377-3378.
IBM Technical Disclosure Bulletin, "Diagnostic Bit Interval Timer", J. D. Dwire et al., vol. 17, No. 8, Jan. 1975, pp. 2418-2420.

*Primary Examiner*—Jerry Smith
*Assistant Examiner*—Michael R. Fleming
*Attorney, Agent, or Firm*—Charles E. Rohrer

[57] ABSTRACT

A method and circuit for using signature analysis testing techniques without deriving start/stop and clock signals from the device under test. In this invention, a start signal is derived from the output data stream by configuring that data stream to indicate when the test stream begins. The stop signal is derived by counting the predetermined number of data bit cells to be measured and issuing the stop signal when the count is reached. Data clock pulses are derived as a fraction of test system clock pulses at a frequency approximately equal to the bit cell frequency. The data clock pulse is located at the midpoint of the bit cell time so that the data stream is clocked into the signature analysis tester at a stable point.

4 Claims, 4 Drawing Figures $R = \dfrac{fCK}{fDK} = 4$ CLOCK RATE MULTIPLIER and more particularly to a functional tester utilizing signature analysis techniques where the start/stop pulses and the signature clock pulses are not derived from the device under test.

SELF-CLOCKED SIGNATURE ANALYZER

This invention relates to the testing of digital circuits and more particularly to a functional tester utilizing signature analysis techniques where the start/stop pulses and the signature clock pulses are not derived from the device under test.

BACKGROUND OF THE INVENTION

Testing of digital devices by the signature analysis technique involves placing of output signals from the card under test into a shift register. The output signals are produced as a result of input signals which are applied to the card under test according to a predetermined sequence. The result of the test contained in the shift register represents the product of all of the output signals produced over a period of time although the resulting "signature" may be, for example, only 16 bits long if a 16 character shift register is used. If the circuit operates properly, those 16 bits should correspond to an expected 16 bits and the operation of the card can be termed a success. It is crucial in this test that the production of the signature begin at a specific known time in the operation of the card under test and end at a specific known time. If the start or stop signal is off by even one bit, the resulting signature will be incorrect and a properly operating card might be considered faulty. Also, it is crucial that the signature clock does not coincide with transitions in the signal from the card under test for this could cause different readings for a properly operating card (unstable signature readings).

U.S. Pat. Nos. 3,976,864 and 4,192,451 disclose apparatus for testing digital equipment with the signature analysis technique. In each of these previous arrangements, however, it is a requirement that the device under test provide the necessary start and stop signals and signature clock in order to operate the signature generator. The result is a limitation on the usefulness of the signature analysis technique since some integrated circuits such as, for example, a single chip microprocessor, may not be provided with the necessary testability requirements for signature analysis. That is to say, the clock cycles of certain circuits are not available on I/O pins.

SUMMARY OF THE INVENTION

This invention relates to a technique for obtaining the start signal for generating a signature by deriving it from the first transition in the output data stream produced by the card under test. This is accomplished by causing the output data stream to carry a flag signal for detection by the test equipment so that the approaching test output data stream can be monitored. For example, the output data stream can carry a signal with an arbitrarily long time span in which the signal is kept, for example, in the "one" state followed by a transition to the "zero" state. That transition flags the beginning of the data bit stream to be measured and the start signal can be derived from it. The invention also requires that the bits to be measured fall into predefined bit cell time periods so that a clock may be generated to move data bits into the signature analysis tester under stable conditions. The stop pulse is generated by counting the predefined number of bit cells to be measured in any particular test and issuing the stop signal when the count is reached.

BRIEF DESCRIPTION OF THE DRAWINGS

The above-mentioned and other features and objects of this invention and the manner of attaining them will become more apparent and the invention itself will best be understood by reference to the following description of embodiments of the invention taken in conjunction with the accompanying drawings, the description of which follows.

DETAILED DESCRIPTION

Signature analysis is a common method used to test for proper operation of complex electronic circuits. To perform the test, the electronic circuit is put into a known loop which has no feedback and selected nodes are tested to see that an output pattern, i.e., a signature, is generated. The correct output signature is a specific cyclic redundancy check (CRC) code. Depending on the value and stability of this CRC code, a node can be verified as operating correctly by a comparison of the generated code with an expected code. The generated code value is obtained by clocking the output data stream of a node under test into a CRC generator, for example, a feedback shift register. Clock pulses are chosen such that the signal from the node under test does not change as the clock enables the sampling of the output data stream.

Various types of apparatus have been devised to test digital circuits utilizing the signature analysis technique such as, for example, those apparatus disclosed in the two patents above-named. The invention to be described herein may be utilized with any appropriate test equipment utilizing signature analysis.

Figure 1:
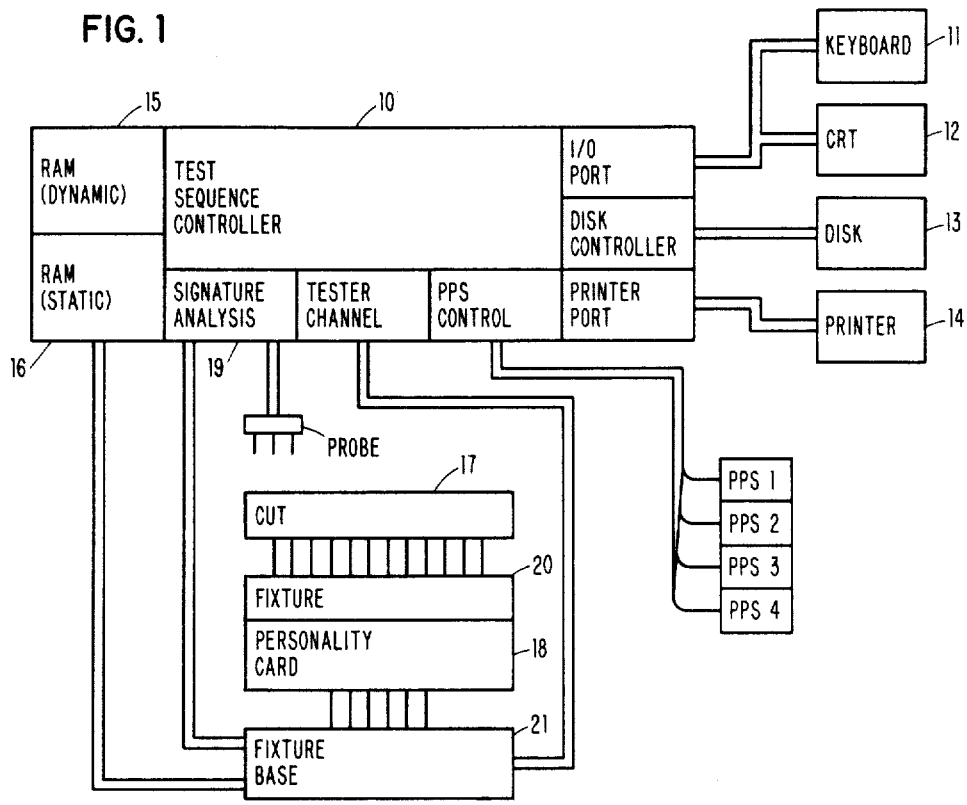
FIG. 1 illustrates one type of test equipment using the signature analysis technique.

FIG. 1 shows particular automated test equipment utilizing signature analysis techniques. This equipment provides for checking the proper operation of a circuit and if improper, for troubleshooting the circuit to identify the faulty component. In FIG. 1, a CPU 10 is combined with standard peripherals such as a keyboard and cathode ray tube (CRT) device 11 and 12, disk drives 13, and a printer 14. These peripherals enable the inputting of specific test sequences and the outputting of results. A dynamic access memory (RAM) 15 provides storage for receiving the operational software and tables used to control the test sequence. For example, RAM 15 will contain the microcode required to exercise the card under test. This microcode is advantageously divided into segments, each of which is a completely self-contained routine which runs in a loop for signature analysis. The test microcode segments are down-loaded by the CPU one segment at a time into a small dual port static RAM 16. When the CPU releases reset to the card under test 17, the microprocessor on the card under test (or on the personality card 18) is then able to execute an individual test segment available to it in the dual port RAM 16, looping the routine continuously until all signatures relating to that routine have been measured. On completion of a set of measurements, reset to the card under test is reactivated while the next microcode routine is down-loaded into RAM 16.

In the test equipment of FIG. 1, all test fixtures 20 carry a personality card 18 and plug into a common interface structure, base 21. The common interface consists of the CPU channel, the static RAM interface, the signature analyzer interface and programmable power supply (PPS) voltages. An output port address is reserved so that the CPU can toggle reset on the card under test 17 and control other test points and setup conditions. The tester CPU channel attaches to circuitry on each individual personality card to accomplish this function.

For each card tested on the signature analysis tester shown in FIG. 1, a special personality card 18 is required to provide the interface from the card under test to the tester. Personality card 18 also provides a location for additional circuitry required for signature analysis. By locating special circuits for test purposes on the personality card, significant cost savings can be effected in product cards which might otherwise have to carry the hooks required to interface directly to a signature analyzer unit. With this approach, the product card can be merged with the personality card to form a single entity for test purposes. For example, if the card under test contains a microprocessor, the personality card connects input and output pins on the card under test to enable the microprocessor to operate according to the test sequence stored in static RAM 16. If the card under test has no microprocessor, it can be placed on the personality card. In either case, the combination of personality card and card under test has the capability of exercising itself to produce the output data stream which is sent to the signature analyzer 19.

The signature analysis unit 19 includes connections for start, stop, clock, and data lines which are received from the card under test. For each required signature, the analyzer 19 will sample the selected data line with the appropriate clock. Once the complete start/stop interval has been sampled, the signature analyzer unit generates an interrupt to the CPU. The CPU can then read the generated signature and compare it to the expected signature. All start, stop, clock and data signals are routed through the personality card to the signature analyzer. Some of the data signals are logically combined to improve test coverage or efficiency while others may pass directly through the personality card after being conditioned by comparators.

One restriction that has been imposed on signature analysis measurements is that the signals derived from the card under test (CUT) and applied to the signature analyzer must be synchronous. These signals include the data bit stream to be measured, the system clock, the start pulse and the stop pulse. The latter two signals must be synchronous to the system clock and are used to gate the data bit stream into the instrument. The problems with using these signals in signature analysis measurements are many. For example, sometimes the clock on the card under test is not directly accessible through a test point and there are cases in which the data, start and stop pulses are synchronous with the system clock, but are asynchronous to each other.

In order to solve this problem, this invention provides a self-clocked signature analyzer that eliminates the requirement that the start, stop and clock pulses be derived from the card under test. In this invention, the only required signal from the card under test is the output data bit stream. The invention does require that the leading edge of the data bit stream follow a predefined format and that the bits to be measured fit into predefined bit cell time periods. If these requirements are not met by transmitted data from the card under test, these requirements can be designed into the data stream. For example, where the card under test operation starts with an internally microprogrammed self-test routine, a small additional piece of microcode can include the leading edge requirements and bit cell time periods to enable a test to be successfully monitored at the I/O port outputs.

Figure 2:
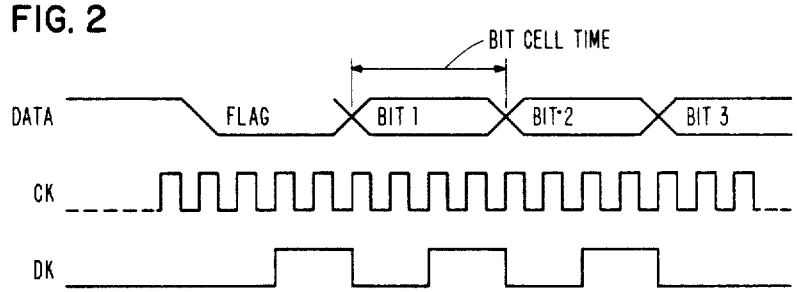
FIGS. 2 and 3 show the relationships between signals used with this invention.

To operate the self-clocked signature analyzer, two parameters need definition and need to be loaded into the instrument at test time, one, a clock rate multiplier, and two, the bit cell count. The bit cell count specifies the number of bits in the data bit stream that is to be measured so that an accurate stop signal can be generated. The clock rate multiplier specifies the number of system clock pulses per data bit so that a data clock signal can be generated to clock each data bit into the signature analyzer under stable conditions. FIG. 2 shows the relationship of the bit cell time, system clock ($C_K$) and data clock ($D_K$) signals used to perform the test. Note that the leading edge of the data clock signal is generated at the midpoint of the bit cell time. This enables the clocking of the data stream into the analyzer under stable conditions. In the illustration in FIG. 2, the clock rate multiplier which indicates the number of system clock pulses per bit cell time is four.

Figure 3:
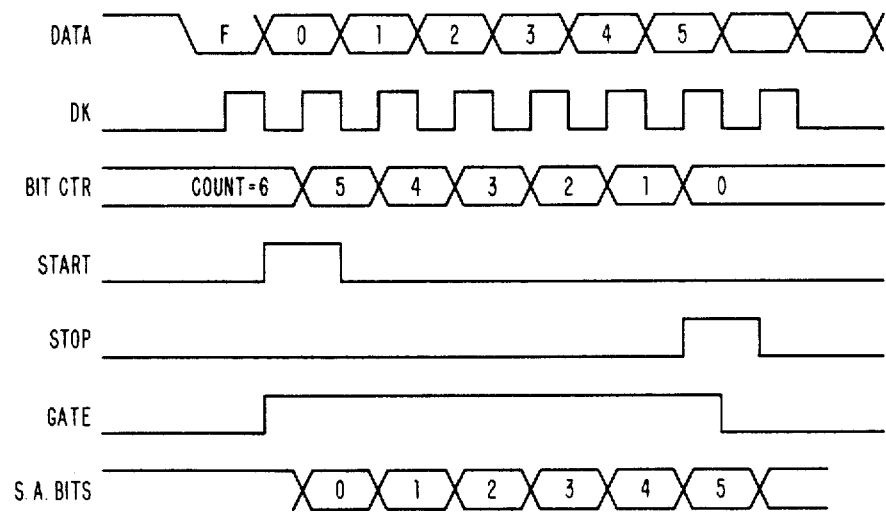

FIG. 3 illustrates a description of waveforms involved in a test where the bit cell count in the particular sequence to be measured is six. The number six is chosen for ease of illustration and could be any number within operational boundaries of the CRC generator and as long as loss of synchronism between clock and data signals does not occur. In FIG. 3, the test data stream is indicated by a first transition signal followed by the six bit cells to be measured. As in FIG. 2, there is one data clock pulse generated per bit cell with the leading edge of the clock pulse located at or near the midpoint of the data bit.

Note that for proper operation, the data to be tested is preceded by an arbitrarily long time span in which the signal is kept in the "one" state followed by the first transition signal, a transition to the "zero" state. The first "one" to "zero" transition is used as a flag signal, i.e., the reference for the start of sampling of the data bit stream. Detection of the first transition signal causes the generation of a start pulse which in turn enables the gate signal. This allows the gating of data bits to the linear feedback register in the signature analyzer unit in order to compute the signature. The start pulse also enables the operation of a bit counter, a down counter which has been loaded with the bit count. A stop pulse is generated when the bit counter goes through zero count. The stop pulse in turn drops the gate signal so that the feedback register contains a signature of the output data stream during the test period.

Figure 4:
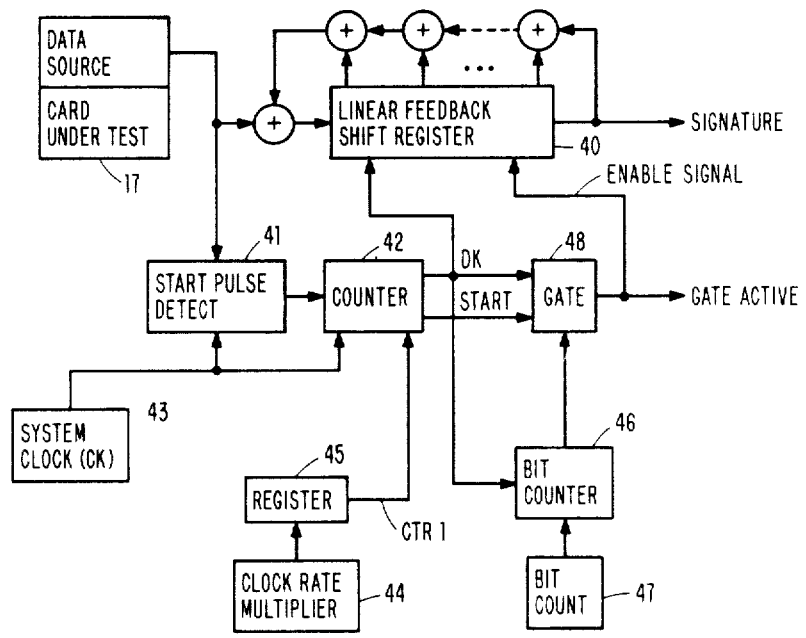
FIG. 4 shows a circuit for implementing the invention.

FIG. 4 shows a circuit to implement the relationships defined in FIGS. 2 and 3. A linear feedback shift register 40 is the device in which the signature is generated and is a part of the signature analyzer shown at 19 on FIG. 1. The input data stream to feedback register 40 is that data which is the output of the card under test 17 and which must conform to the arbitrarily long time span limitation in which the signal is kept in the "one" state as mentioned above in order to produce a detectable first transition signal. That signal is detected at 41 and starts counter 42 to count system clock pulses generated at 43. The first data clock signal ($D_K$) is produced when counter 42 reaches the clock rate multiplier divided by two. The result is the production of the data clock signal at the midpoint of the data bit cell. Thereafter the data clock pulse is generated each time the counter 42 counts to the clock rate multiplier.

The desired clock rate multiplier is loaded into the counter 42 from a manual switch 44 or automatically from CPU 10 through register 45. In either case, the test user must determine the proper clock rate multiplier from knowledge of the system clock frequency and the bit cell time produced by the device under test. Frequently, the user can program bit cell time by setting timers in the device under test and the system clock may be made programmable, if desired.

The start signal is generated when counter 42 first reaches a count equal to the clock rate multiplier. The start signal activates flip-flop gate 46 to pass an enable signal to the signature analyzer feedback shift register 40 so that the output test bit stream is received.

The bit count for the test bit stream may be loaded into the bit count register 46 either manually from switch 47 or automatically by CPU 10. The down-counting bit count register 46 is initiated by the start signal and counts data clock pulses until it produces an output stop signal when the bit count is reached. The stop signal activates flip-flop gating circuit 48 and thereby shuts down the enable signal to feedback shift register 40. All components of the device shown in FIG. 4 are standard registers, counters, detectors or flip-flop circuits and may be included on the personality card 18 if an instrument such as that shown in FIG. 1 is utilized or may be included on any convenient mechanism with or in the signature analyzer instrument of choice.

The signature analysis circuit of this invention works well with a high value of the clock rate multiplier or for a relatively small bit count. For very long bit streams or very high data rates, timing errors can result if the system clock is not an integer multiple of the bit cell time. However, this problem may be alleviated through the use of programmable delay lines on clock and data inputs.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In signature analysis testing, the method of deriving start, stop and clock signals from the output data stream of the device under test comprising the steps of:
generating a flag signal in the output data stream of the device under test, said flag signal indicating the approach of test output data;
detecting said flag signal;
generating a stream of data clock pulse signals independent of said device under test at a rate equal to or approximately equal to the output data stream bit cell time period;
deriving a start test signal from said flag signal;
using said start test signal and said data clock pulse signals to enable the clocking of said test output data stream into a signature analysis code generator;
counting the number of bit cell time periods to be measured beginning with said start test pulse;
generating a stop pulse when said number of bit cell time periods to be measured have been counted; and
using said stop pulse to disable said clocking of said test output data stream into said signature analysis code generator;
whereby a signal status (signature) is generated by said code generator to indicate the operation of the device under test over the measured period.

2. The method of claim 1 wherein said data clock pulse signals are generated near the midpoint of each of said bit cell time periods.

3. The method of claim 2 further including the steps of:
supplying system clock signals with a frequency at a multiple of said bit cell time period;
setting said multiple into a first counter prior to the beginning of the test;
counting said system clock signals in said first counter beginning with the detection of said flag signal;
causing a first data clock signal to be produced when said count of said system clock signals equals one-half of said multiple; and
thereafter causing the production of another data clock signal whenever the count of said system clock signals equals said multiple.

4. The method of claim 3 further including the steps of:
setting said number of bit cell time periods to be measured into a second counter prior to the beginning of the test; and
counting down said second counter upon reception of each data clock signal until said number of bit cell time periods to be measured has been counted.

* * * * *